Feb. 24, 1948. E. B. SOMERS 2,436,678
SWIVEL JOINT FOR REAR VIEW MIRRORS AND THE LIKE
Filed Oct. 12, 1945
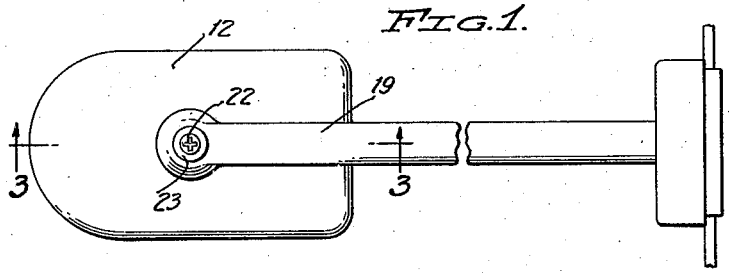
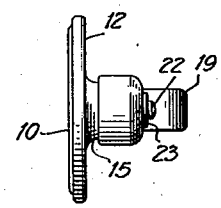
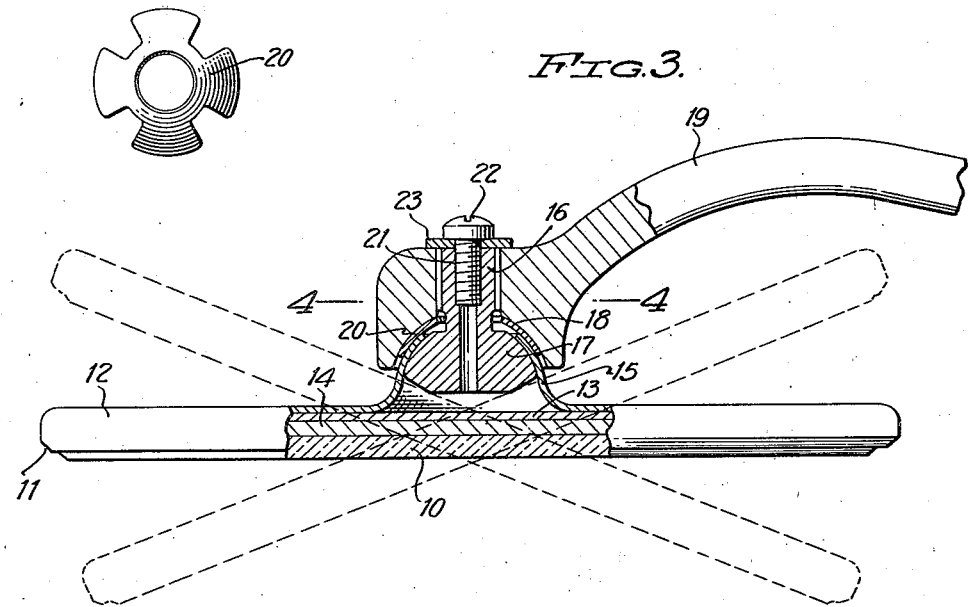
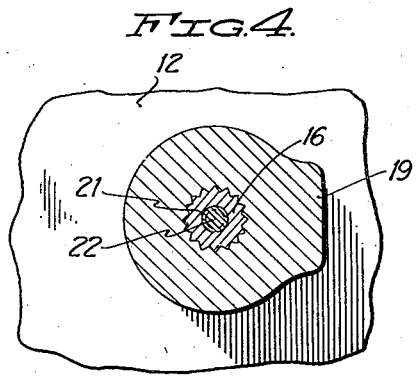
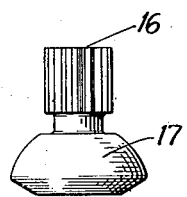
INVENTOR
ELWARD B. SOMERS
BY
ATTORNEYS Patented Feb. 24, 1948

2,436,678

UNITED STATES PATENT OFFICE 2,436,678

SWIVEL JOINT FOR REARVIEW MIRRORS AND THE LIKE

Elward B. Somers, New York, N. Y., assignor to The Roberk Company, Norwalk, Conn.

Application October 12, 1945, Serial No. 621,889

1 Claim. (Cl. 287—12)

This invention relates to new and useful improvements in swivel joints and supports for automobile rear vision mirrors or the like.

The object of the invention is to provide a simple, compact, durable, easily manipulatable joint for a mirror or the like which can be adjusted with ease and, when adjusted, will firmly hold its position until reset.

It is another object to provide a joint which can be made with a minimum number of simple parts which reduces the cost of manufacture.

Further and more specific objects, features, and advantages will more clearly appear from the following specification especially when considered in association with the accompanying drawings which illustrate a present preferred form which the invention may assume and which form part of the specification.

Briefly and in the most general terms, the invention comprises the combination of a supporting arm having a cup-like recess into which is nested a similarly shaped portion on the rear of the mirror casing. A ball swivel element housed within the cup portion on the casing can be loosened or tightened as desired to hold the cup in any desired position in the arm recess.

Furthermore the ball swivel element is connected to a stem having serrations longitudinally thereon which are related to similar serrations in a bore in the supporting arm through which the stem passes so that the stem may be moved longitudinally to adjust the swivel element but cannot turn axially. A simple screw with a flat head engages an inner bore of the stem and bears against a washer on the arm to adjust the ball swivel pressure against the cup on the case. The casing cup member has a rather large central aperture so as to permit it to be tilted or slid angularly to set the mirror at most any angle. Generally the mirror may have an angular swing of about 45 degrees. Between the cup member on the casing and the recess in which it projects there is usually disposed a cup spring to maintain the requisite tension between the parts at all times.

The present preferred form which the invention may assume is illustrated in the drawings of which, Figure 1 is a plan view of the device.

Figure 2 is an end elevation.

Figure 3 is an enlarged horizontal sectional view on the line 3—3 of Figure 1, with parts in elevation.

Figure 4 is a cross sectional view on the line 4—4 of Figure 3.

Figure 5 is a detail side elevational view of the cup spring.

Figure 6 is a side elevational view of the ball swivel element.

The mirror, the adjustable mounting of which is the feature of this invention, is numbered 10 and is bevelled at its periphery to receive the bent over edge 11 of a casing 12 in which is disposed packing 13 and a gasket 14 back of the mirror 10.

The rear face of the casing 12 is turned up in the form of a cup-like protuberance 15 provided with an ample rear opening through which passes the stem or body 16 of a ball swivel element 17. This element lies within the cup 15 and both are disposed in a cup-like recess or cavity 18 formed in the under outer face of the mirror supporting arm 19. Between the face of recess 18 and the cup member 15 is disposed a cup spring member 20. The hollow resilient member 15 acts so that the casing of the mirror which is clamped to the arm 19 by the swivel element 17 is always held so tightly that it will remain in any position of adjustment.

The stem or shank 16 passes through a bore in the arm 19 and both the bore and the stem are serrated vertically and these serrations are disposed in relation to each other to prevent the stem from turning in the bore while at the same time permitting it to slide or be adjusted longitudinally. The stem is also provided with a threaded inner bore 21 to receive a headed adjusting screw 22, the head of which will bear on a flat washer 23 disposed on top of the face of the arm 19.

The curvatures of the elements 15, 17, 18, and 20 are noted as being the same approximately so that when the screw 22 is tightened up it will draw the stem 16 longitudinally and draw the ball swivel member 17 upwardly to press against the cup 15 and hold it firmly in the recess 18 against the pressure or resiliency of the cup spring 20. Thus the mirror 10 will remain in its adjusted position until the operator loosens the screw again and turns the casing 12 to rotate the cup 15 in a sliding manner between the ball swivel element 17 and the cup spring 20 until the casing 12 assumes the desired position whereupon the screw 22 is then tightened up again.

The device is made of few simple compact parts and its operation is such as to require a minimum of time and attention. It is durable, very compact, and tight. It essentially comprises an arm with a cup-like recess to receive a similarly shaped member extending from the rear of the mirror casing, with the adjustably disposed ball swivel element holding the cup in position and capable of sliding movement but not a turning movement.

While the invention has been described in detail and with respect to a present preferred form which the invention may assume, it is not to be limited to such details and form since many changes and modifications may be made in the invention without departing from the spirit and scope of the invention in its broadest aspects. Hence it is desired to cover any and all forms and modifications of the invention which may come within the language or scope of the appended claim.

What I claim as new and desire to secure by Letters Patent is:

Means for securing a mirror casing to a supporting arm, said casing having a substantially spherical protuberance, said supporting arm having a bore through one end and a cavity in one end of said bore, a cup-shaped resilient member disposed between said arm and the outer wall of said protuberance, a headed member having a shank with the head seated in the protuberance and the shank passing through the bore of the arm, and means securing said shank to said arm.

ELWARD B. SOMERS.

REFERENCES CITED

The following references are of record in the file of this patent:

UNITED STATES PATENTS

| Number | Name | Date |
|---|---|---|
| 898,391 | Peterson | Sept. 8, 1908 |
| 1,239,653 | Willard | Sept. 11, 1917 |
| 1,391,012 | Schulder | Sept. 20, 1921 |
| 1,435,310 | Kipper | Nov. 14, 1922 |
| 1,446,164 | D'Eyraud | Feb. 20, 1923 |
| 1,537,039 | Short | May 5, 1935 |
| 1,909,526 | Falge | Mar. 23, 1932 |
| 1,975,552 | Matthes | Oct. 2, 1934 |
| 2,202,472 | Tornblom | May 28, 1941 |